D. RIOUX.
SPIRAL TOOL DRIVER.
APPLICATION FILED JULY 19, 1910.
973,881.
Patented Oct. 25, 1910.
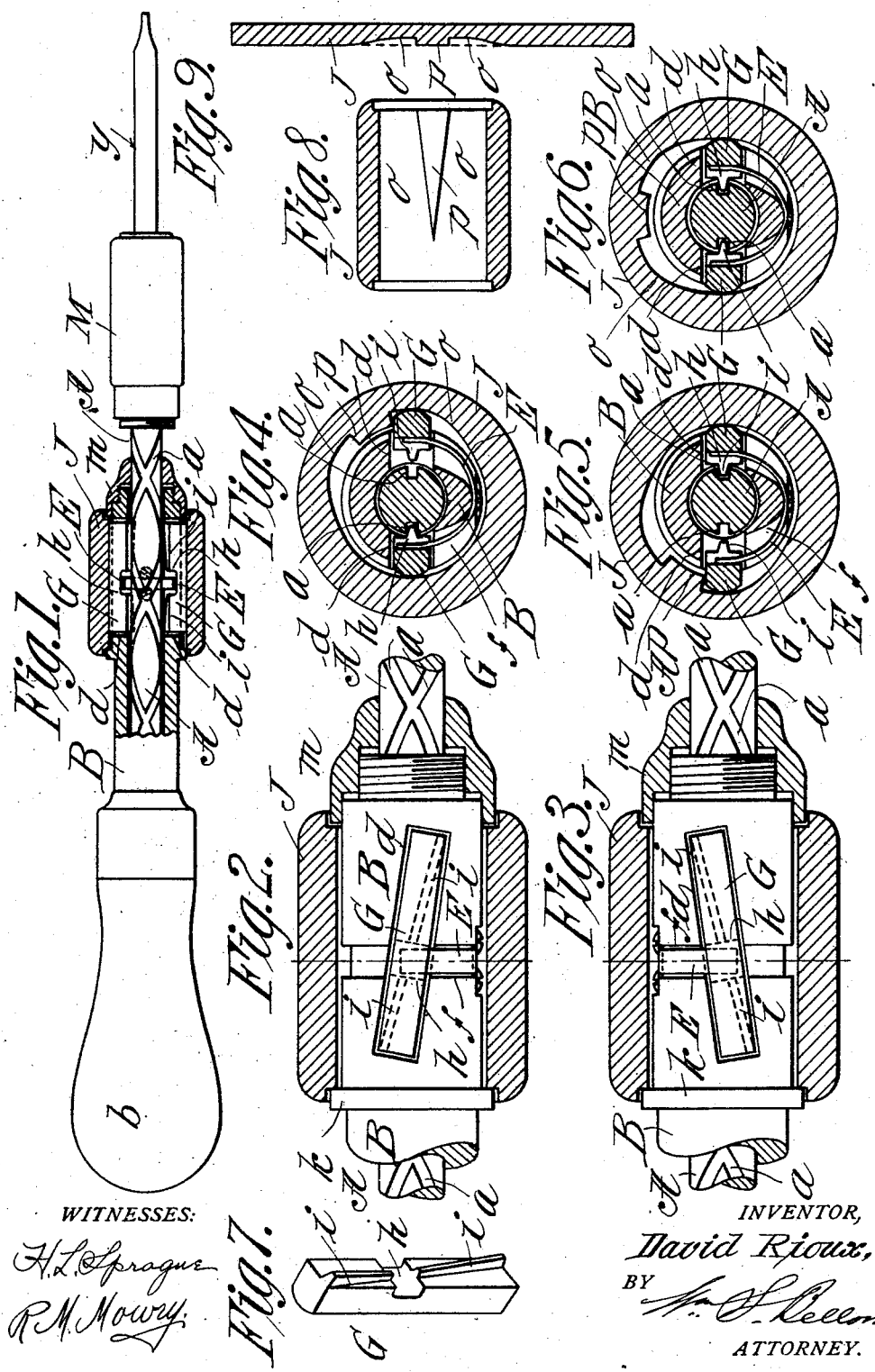
WITNESSES:
H. L. Sprague
R. M. Mowry
INVENTOR,
David Rioux,
BY
ATTORNEY.
THE NORRIS PETERS CO., WASHINGTON, D. C.

UNITED STATES PATENT OFFICE.

DAVID RIOUX, OF SPRINGFIELD, MASSACHUSETTS.

SPIRAL TOOL-DRIVER.

973,881.

Specification of Letters Patent. Patented Oct. 25, 1910.

Application filed July 19, 1910. Serial No. 572,660.

*To all whom it may concern:*

Be it known that I, DAVID RIOUX, a British subject, and resident of Springfield, in the county of Hampden and State of Massachusetts, have invented certain new and useful Improvements in Spiral Tool-Drivers, of which the following is a full, clear, and exact description.

This invention relates to spiral tool drivers of a general kind, well known as comprising a shaft,—which is connected or engaged with the chuck or holder for the screw driver or other tool,—which is made with double, reversely arranged and crossing spiral grooves, and a tubular handle part within and relatively to which the grooved shaft has an endwise movement, together with a pair of oppositely arranged dogs in said tubular part with means for throwing either one of the dogs into engagement with either one of the spiral grooves so that in the operation of the implement the screw driver may be turned to the right for screwing in, or turned to the left for unscrewing; the said dog operating means being effective at pleasure for simultaneously holding both the dogs into engagement with the spiral shaft so that the same becomes as a fixed shank for the implement and by being non-rotative relatively to the tubular handle part is, then, so far as its operative capacity is concerned, like an ordinary, simple, screw driver.

The invention particularly relates to the combination and arrangement of the dogs which engage the spiral grooves of the operating shaft with the means for retaining them in their place in the implement, for automatically throwing them outward to their disengaging positions, and for throwing them, one or the other, or both together into their groove engaging positions, the object being to render the screw driver of extreme simplicity, to impart the capability of a very strong and reliable engagement of the dogs in the grooves of the operating shaft and of rendering the implement durable and reliable for protracted use without the same becoming deranged.

The invention is described in conjunction with the accompanying drawings and is defined in the claims.

In the drawings Figure 1 is a side view of the spiral shaft screw driver with a portion thereof in which the especially novel features of the invention are comprised shown in section. Figs. 2 and 3 are partial longitudinal sectional views at opposite sides of the implement at the same portion sectionally represented in Fig. 1, but as seen at right angles to said first figure. Figs. 4, 5 and 6 are cross sections taken on line *x—x*, Fig. 2, but showing the rotatively adjustable dog inclosing shell as in different positions for different operative effects. Fig. 7 is a perspective view of one of the duplicated dogs comprised in the device. Fig. 8 is a sectional view through the rotative shell, and Fig. 9 is a development showing the cam formations of its inner surface.

Similar characters of reference indicate corresponding parts in all of the views.

In the drawings, A represents the tool operating shaft made with double and oppositely coursing spiral grooves *a* of suitable pitch.

B represents a handle member which is of tubular form closed at its upper or butt end at which the handle, proper, *b*, is comprised, and open at its forward end. Toward the forward portion of the tubular handle member in opposite sides thereof are apertures *d d*, which are oppositely oblique from the axial line of the handle member, as comparison of the opposite side views, Figs. 2 and 3, will show.

E represents a plate or flat spring which intermediately thereof is secured by being screwed on the tubular member; and said spring, being of a curved or bow form extending through approximately a half of a circle, is arranged so that its free and reacting extremities cross the opposite apertures *d d* and are somewhat within the depth thereof by reason of the said spring being sunk in the recess *f* therefor in the tubular part B.

G G represent the pair of dogs which are located in the said apertures *d d*, and which have recesses each in its intermediate portion at its inner side, as represented at *h*, and the said dogs are by such recessed portions in engagement with the extremities of the said curved flat spring; and each dog has at its portion between the recess *h* and its opposite ends the inwardly projecting ribs *i i* for engagement in the reversely running spiral groove *a* of the operating shaft A.

J represents a tubular shell or sleeve which is fitted and rotatively adjustable about the portion of the hollow handle member B at which the dogs have their engagements, endwise movement of this sleeve being prevented in one direction by the shoulder $k$, and in the other direction by the thimble $m$ which has a screw engagement with the forward end portion of the handle member. The internal wall of the sleeve or shell J has cam surfaces $o\ o$ as particularly shown in Figs. 4, 5, 6 and 8, and with a " full " internal projection or rib $p$ to constitute a stop.

It will be stated that this implement similar to others of the same general kind is provided with a cylindrical member M which constitutes a holding member to be grasped by one hand, and which comprises a chuck at its forward end for a screw driver $y$ or other tool to be operated; and the connection between the forward end of the spirally grooved operating shaft and the holding member is of such character that the holding member and shaft may at times be in clutch and non-rotative one relatively to the other or thrown to such manner of disengagement that the shaft may rotate freely and independently of the holding member. But as the provisions last referred to are common in this class of spiral shaft screw drivers and are not claimed herein, especial illustration of the same is omitted.

For screw driver uses the implement may be set so that when the handle member, in its most rearward or extended position relatively to the shaft, is then forced down with a straight thrust by one hand toward the holding member M which is in the firm grasp of the other hand, the spirally grooved operating shaft because of the engagement of the obliquely positioned ribs of the inwardly forced dog will have a turning motion to the right as for turning in a screw; and a condition of the device as last referred to may be such as represented in the cross section Fig. 4, while when the cam shell J is turned to the other extreme position, as represented in Fig. 5, the forward or downward thrusts of the tubular handle member, the other dog of which is now in engagement with the spiral groove of the shaft, will cause a reversed turning of the shaft as required for unscrewing.

The setting of the shell for either of the reversed rotative movements of the groove operating shaft will be limited and determined by the stop rib $p$ on the inside of the shell which will be brought to abutment with the side of one or the other of the dogs G as clearly represented in Figs. 4 and 5; but by turning the shell so that it has the position represented in Fig. 6 with the full portions of the opposite cams $o\ o$ in impingement on both of the dogs, so that both are at the same time crowded inwardly to engagements with the reversely spiral and crossing grooves, the handle member is brought into deadlock with the operating shaft so that it cannot have any sliding movement axially relatively to the shaft, and so that any turning movement of the handle will necessarily turn the shaft as one with it, rendering the implement under such conditions like the ordinary simple screw driver in which the handle is permanently affixed to the shank of the tool.

Simplicity and cheapness is acquired by the form and arrangement of the spring E as shown in conjunction with the opposite dogs having the recesses $h$ midway between their ends at their inner sides; and strong and effective engagements are insured by the provision at the inner sides of the dog of the duplicated ribs $i\ i$ opposite each recess $h$.

I claim:—

1. In a spiral tool driver, the combination with a tool operating shaft made with double oppositely running spiral grooves, of a handle member of tubular form, inclosing and axially movable relatively to the shaft, provided in opposite sides with apertures, dogs in said apertures having ribs in oblique arrangements corresponding to the spirality of the said reversely running grooves; a shell fitted about the tubular and apertured member rotatively adjustable relatively thereto, and inclosing said dogs, and having internal cam surfaces coöperative with the dogs, and means for forcing the dogs outwardly from the grooved operating shaft.

2. In an implement of the character described, the combination with a tool operating shaft made with double oppositely running spiral grooves, of a handle member of tubular form inclosing and movable axially relatively to the shaft, provided in opposite sides with apertures therethrough, a flat curved spring which intermediately thereof is secured on the tubular member and which has its extremities extended across both said apertures, dogs located in said apertures having recesses at intermediate portions of their inner sides by which they are engaged with the extremities of said curved springs and having their portions oppositely beyond said recesses provided with inwardly projecting ribs for engagement in said reversely running grooves, and a shell fitted and rotatably adjustable about the tubular apertured member having internal cam surfaces coöperative with the backs of the dogs.

Signed by me at Springfield, Mass., in presence of two subscribing witnesses.

DAVID RIOUX.

Witnesses:
 D. J. Rioux,
 Wm. S. Bellows.